(12) United States Patent
Costantino et al.

(10) Patent No.: US 6,268,054 B1
(45) Date of Patent: Jul. 31, 2001

(54) DISPERSIBLE, METAL OXIDE-COATED, BARIUM TITANATE MATERIALS

(75) Inventors: Stephen A. Costantino, Reading, PA (US); Robert A. Hard, Hallowell, ME (US); Sridhar Venigalla, Macungie, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 08/923,680

(22) Filed: Sep. 4, 1997

Related U.S. Application Data

(63) Continuation-in-part of application No. 08/801,406, filed on Feb. 20, 1997, now abandoned, and a continuation-in-part of application No. 08/801,450, filed on Feb. 18, 1997, now abandoned.
(60) Provisional application No. 60/045,633, filed on May 5, 1997.

(51) Int. Cl.⁷ ....................................................... B32B 5/16
(52) U.S. Cl. ........................... 428/403; 428/404; 501/137; 501/138; 501/139
(58) Field of Search .................................... 501/137, 138, 501/139; 428/403, 404

(56) References Cited

U.S. PATENT DOCUMENTS

| | | | |
|---|---|---|---|
| 3,496,008 | 2/1970 | Haskins | 117/215 |
| 3,612,963 | 10/1971 | Piper et al. | 317/261 |
| 3,717,487 | 2/1973 | Hurley et al. | 106/48 |
| 4,055,850 | 10/1977 | Prakash | 361/305 |
| 4,219,866 | 8/1980 | Maher . | |
| 4,266,265 | 5/1981 | Maher | 361/321 |
| 4,384,989 | 5/1983 | Kamigaito et al. | 252/516 |
| 4,459,364 | 7/1984 | McSweeney et al. | 501/137 |
| 4,461,844 | 7/1984 | Itakura et al. | 501/137 |
| 4,499,521 | 2/1985 | McSweeney et al. | 361/321 |
| 4,517,155 | 5/1985 | Prakash et al. | 419/19 |

(List continued on next page.)

FOREIGN PATENT DOCUMENTS

WO 93/16012  8/1993  (WO) ............................. C04B/35/46
WO 9740199  * 10/1997  (WO) .

OTHER PUBLICATIONS

Bruno et al. "Higher Performance Multilayer capacitor Dielectrics from Chemically Prepared Powders" May, 1993.

*Primary Examiner*—Hoa T. Le

(57) ABSTRACT

Barium titanate-based particles having a coating comprising an oxide, hydrous oxide, hydroxide or organic acid salt of a metal other than barium or titanium, wherein at least 90 percent of said particles have a particle size less than 0.9 micrometer when said particles are dispersed by high shear mixing, useful in the fabrication of thin, fine-grained dielectric layers for multilayer ceramic capacitors with high breakdown voltage.

73 Claims, 5 Drawing Sheets

U.S. PATENT DOCUMENTS

| | | | |
|---|---|---|---|
| 4,541,676 | 9/1985 | Chu et al. | 501/138 |
| 4,558,020 | 12/1985 | Itakura et al. | 501/137 |
| 4,616,289 | 10/1986 | Itakura et al. | 361/321 |
| 4,640,905 | 2/1987 | Burn | 501/137 |
| 4,643,984 | 2/1987 | Abe et al. | 501/134 |
| 4,764,493 * | 8/1988 | Liley et al. | 501/137 |
| 4,816,430 | 3/1989 | Chu et al. | 501/137 |
| 4,829,033 | 5/1989 | Menashi et al. | 501/139 |
| 4,832,838 * | 5/1989 | Menashi et al. | 423/598 |
| 4,832,939 | 5/1989 | Menashi et al. | 423/598 |
| 4,863,883 | 9/1989 | Menashi et al. | 501/138 |
| 4,880,757 * | 11/1989 | Henslee et al. | 501/104 |
| 4,882,305 | 11/1989 | Chu et al. | 501/138 |
| 4,898,844 | 2/1990 | Maher et al. | 501/138 |
| 4,929,574 | 5/1990 | Iltis et al. | 501/137 |
| 4,939,108 | 7/1990 | Dean | 501/137 |
| 4,968,460 | 11/1990 | Thompson et al. | 264/6 |
| 5,010,443 | 4/1991 | Maher | 361/321 |
| 5,011,804 | 4/1991 | Bergna et al. | 501/138 |
| 5,029,042 | 7/1991 | Dean | 361/321 |
| 5,065,274 | 11/1991 | Berghout et al. | 361/321 |
| 5,082,810 | 1/1992 | Bergna et al. | 501/134 |
| 5,082,811 | 1/1992 | Bruno | 501/134 |
| 5,084,424 | 1/1992 | Abe et al. | 501/137 |
| 5,086,021 | 2/1992 | Sasaki et al. | 501/137 |
| 5,128,289 | 7/1992 | Wilson | 501/137 |
| 5,155,072 * | 10/1992 | Bruno et al. | 501/138 |
| 5,250,481 | 10/1993 | Park | 501/138 |
| 5,296,426 | 3/1994 | Burn | 501/139 |
| 5,335,139 | 8/1994 | Nomura et al. | 361/4 |
| 5,340,605 | 8/1994 | Silver et al. | 422/126.3 |
| 5,362,693 | 11/1994 | Chu et al. | 501/13 |
| 5,453,262 | 9/1995 | Dawson et al. | 423/593 |

* cited by examiner

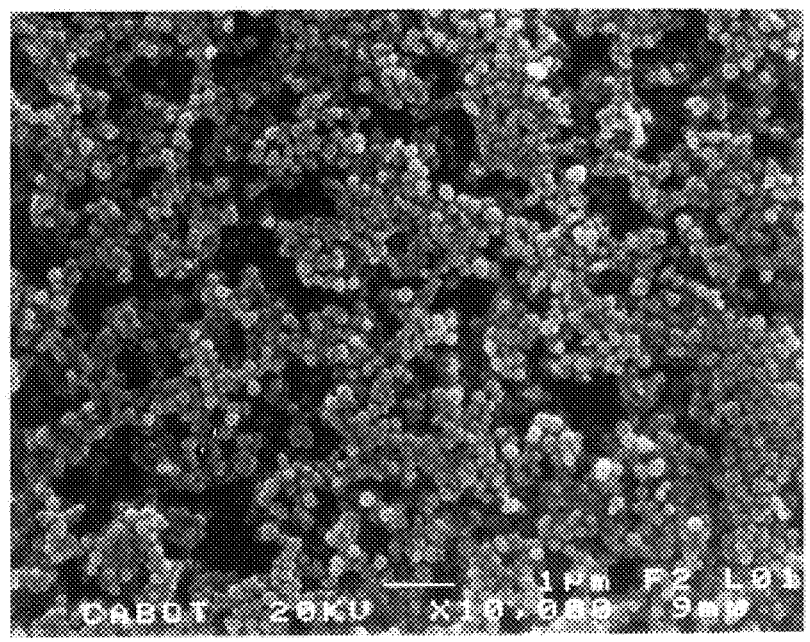
FIG. IA
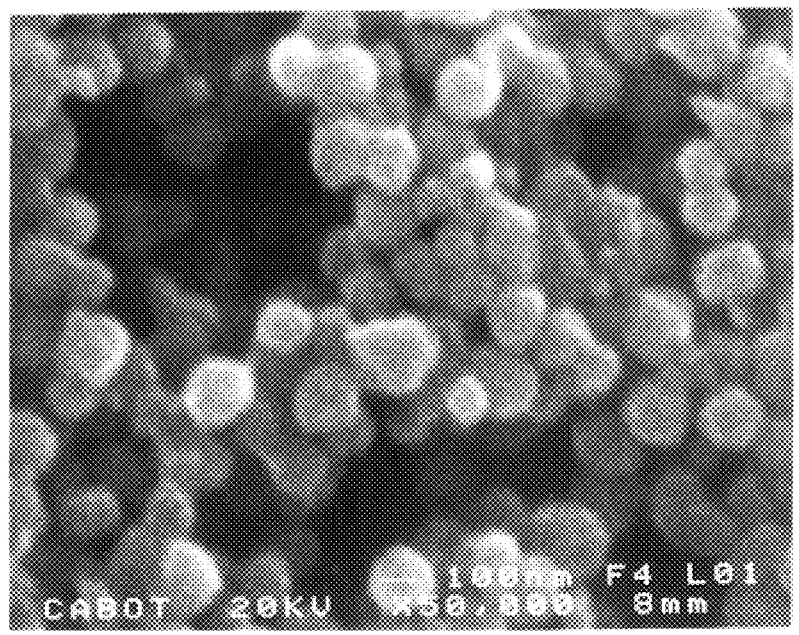
FIG. IB

DISPERSIBLE, METAL OXIDE-COATED, BARIUM TITANATE MATERIALS

CROSS REFERENCE TO RELATED APPLICATIONS

This application is a continuation-in-part of U.S. application Ser. No. 08/801,450 filed Feb. 18, 1997 now abandoned entitled "Dispersible, Metal Oxide-Coated, Barium Titanate Materials" and Ser. No. 08/801,406 filed Feb. 20, 1997 entitled "Dispersible, Metal Oxide-Coated, Barium Titanate Materials", now abandoned, and claims priority to U.S. Provisional Application Serial No. 60/045,633 filed May 5, 1997 entitled "Dispersible, Metal Oxide-Coated Barium Titanate Materials."

BACKGROUND OF THE INVENTION

The high dielectric constant of barium titanate-based materials make them suitable materials for multilayer ceramic capacitors, commonly referred to as "MLC's". MLC's comprise alternating layers of dielectric and electrical conductor materials. Examples of MLC's are disclosed in U.S. Pat. Nos. 3,612,963 and 4,435,738. Palladium, silver, palladium-silver alloys and nickel are common electrical conductor materials used in MLC's. The dielectric layers of an MLC are usually prepared from a high solids dispersion, known in the art as a "slip". Such slips typically comprise powdered barium titanate-based material and a polymeric binder in an aqueous or non-aqueous solvent. Films of binder-stabilized powder made by casting or coating with a slip are dried to provide a "green" layer of ceramic dielectric. Green layers are coated with conductor materials in a pattern and are then stacked to provide a laminate of alternating layers of green ceramic dielectric and conductor. The stacks are diced into MLC-sized cubes which are heated to burn off organic materials such as binder and dispersant and then fired to sinter the particles of barium titanate-based material to form a capacitor structure with laminated, dense ceramic dielectric and conductor layers. Sintering temperatures are typically in the range of 1000 to 1500° C. During sintering increased ceramic dielectric density is achieved as a result of the fusion and consolidation of the particles to form grains. Even with the use of grain growth inhibitors, ceramic grain size in an MLC dielectric layer is typically larger, e.g. by a factor of 3 to 5, than the size of the original primary particles. Moreover, not all porosity is removed during the sintering process. Typically, 2 to 10% porosity remains in MLC dielectric layers. These pores, or hole defects, in the dielectric layer, tend to be larger in larger grain size ceramics. Certain critical capacitor properties such as break down voltage and DC leakage are influenced by dielectric thickness, grain size and pore defects. For instance, it is believed that effective dielectric layers need to be several, e.g. at least 3 to 5, grains thick. Because a defect in any one of the layers of an MLC can be fatal to its performance, MLC's are manufactured with a sufficient thickness of dielectric layer to effectively reduce the impact of ceramic defects which can be caused by random large grains or pores, adversely affect the properties of the MLC.

With the market demand for miniaturization in the design of electronic devices there is a need in the MLC industry for ceramic materials that will allow thinner dielectric layers without incurring the catastrophic effects of large grain and pore size relative to dielectric thickness.

Barium titanate powders produced by prior art processes, e.g. calcination or hydrothermal processes, have large particles and/or strongly-agglomerated fine particles of a size substantially larger than 1 μm and that such particles and agglomerates are not readily amenable to the production of MLC's with fine grained, ultrathin dielectric layers, e.g. less than 4–5 μm. Thus, it would represent an advance in the art to provide a barium titanate-based material that would be suitable for making MLC's with thinner dielectric ceramic layers, e.g. less than 4 μm, with acceptable or exceptional electrical properties including DC leakage and breakdown voltage without the need for extended milling.

SUMMARY OF THE INVENTION

This invention provides barium titanate-based particles having a coating comprising a metal oxide, metal hydrous oxide, metal hydroxide or organic acid salt of a metal other than barium or titanium, wherein at least 90 percent of said particles have a particle size less than 0.9 micrometer when the coated particles are dispersed by high shear mixing. As used herein the term "barium titanate-based" refers to barium titanate, barium titanate having another metal oxide coating and other oxides based on barium and titanate having the general structure $ABO_3$, where A represents one or more divalent metals such as barium, calcium, lead, strontium, magnesium and zinc and B represents one or more tetravalent metals such as titanium, tin, zirconium and hafnium. This invention also provides compositions comprising such barium titanate-based particles of this invention, e.g. in a variety of forms such as slurry, wet cake, powder, dispersion and slip.

Such particles are easily dispersible without the need for milling into submicron dispersions which are advantageous in the manufacture of MLC's with thin dielectric layers having submicron grain size and high breakdown voltage. High shear mixing is effective in reducing the size of agglomerates of particles of this invention and involves de-agglomeration or separation of agglomerates into smaller coated particles without milling, e.g. impacting the particles with hard, milling media such as rods, balls or zirconia particles, etc. Since milling can split particles into smaller than the primary particle size resulting in non-equiaxed particles with exposed, i.e. uncoated, surface, in a preferred embodiment the particles of this invention are unmilled, e.g. characterized by particles having a major portion of the surface covered by the coating. In another aspect of the invention unmilled particles are characterized as equiaxed or spherical.

Another aspect of this invention provides a method for making submicron, barium titanate-based particles with a metal oxide coating comprising:
  (a) providing submicron, barium titanate-based particles in a liquid medium,
  (b) adding to the liquid medium one or more soluble metal salts to provide submicron, particles with a coating comprising an oxide, hydrous oxide, hydroxide or organic acid salt of said metal.

Still another aspect of this invention provides a method of making a dispersion of submicron, barium titanate-based particles in a liquid medium, said method comprising de-agglomerating a dispersion of barium titanate-based particles in the liquid medium until the particle size distribution is less than 0.9 micrometer. Such de-agglomerating is preferably effected by high shear mixing.

BRIEF DESCRIPTION OF THE DRAWINGS

FIGS. 1A and 1B are photomicrographs illustrating an embodiment of barium titanate-based particles of this invention; the illustrated particles have a metal oxide coating and primary particle size in the range of 0.1 to 0.2 μm.

DETAILED DESCRIPTION OF PREFERRED EMBODIMENTS

This invention provides barium titanate-based particles having a coating comprising a metal oxide, metal hydrous oxide or metal hydroxide or mixtures thereof wherein said coated particles have a particle size less than 0.9 micrometer.

Such particles are easily dispersible without the need for milling into submicron dispersions which are advantageous in the manufacture of MLC's with thin dielectric layers having submicron grain size and high breakdown voltage. High shear mixing is effective in reducing the size of agglomerates of particles of this invention and involves de-agglomeration or separation of agglomerates into smaller coated particles without milling, e.g. impacting the particles with hard, milling media such as rods, balls or zirconia particles, etc. Since milling can split particles into smaller than the primary particle size resulting in non-equiaxed particles with exposed, i.e. uncoated, surface, in a preferred embodiment the particles of this invention are unmilled, e.g. characterized by particles having a major portion of the surface covered by the coating. In another aspect of the invention unmilled particles are characterized as equiaxed or spherical.

Such particles are useful in providing monolithic capacitors comprising a ceramic body having a grain size of less than 0.3 micrometers. Preferred MLC's exhibit an X7R temperature coefficient of capacitance and have a dielectric thickness of less than 4 $\mu$m and a dielectric strength of at least 100 volts per $\mu$m.

Primary particle size of particles according to this invention is conveniently determined by reference to scanning electron micrographs (SEM), e.g. as illustrated by reference to FIG. 1. While it is understood that particles of this invention may comprise primary particles of varying sizes, in preferred aspects of the invention the metal oxide-coated, barium titanate-based particles have a primary particle size, e.g. an average primary particle size, less than 0.6 $\mu$m. In other preferred aspects of the invention the particles have a primary particle size of less than 0.5 micrometer, or lower, and preferably less than 0.4 micrometer. In even more preferred aspects of this invention the particles have a primary particle size of less than 0.3 micrometer or lower, and in some cases even more preferably less than 0.2 micrometer.

Figure 3A:
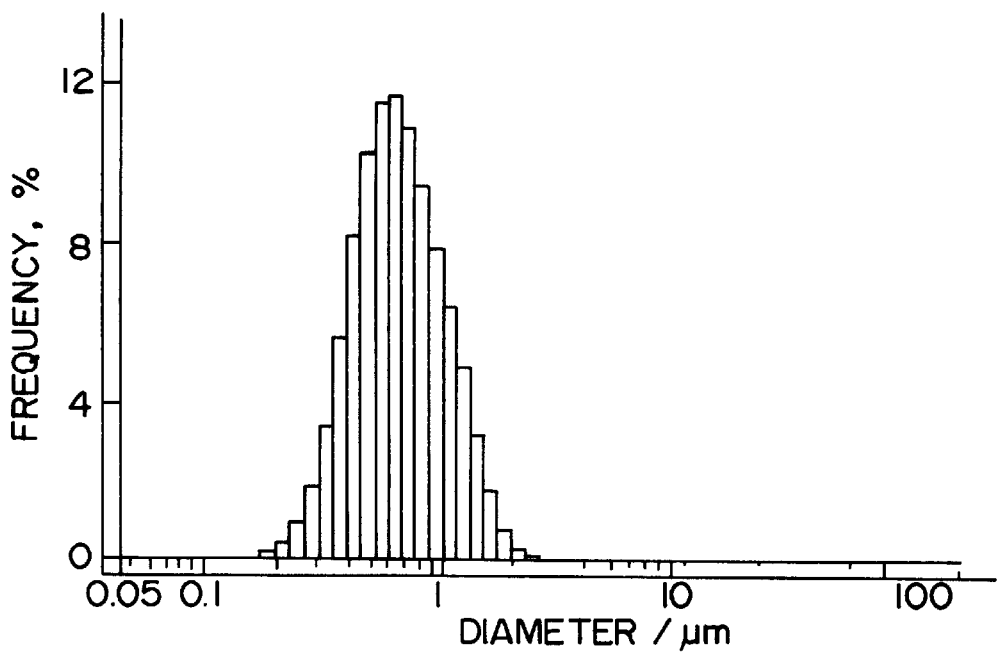
FIGS. 3A and 3B are histograms showing particle size distribution of an embodiment of barium titanate particles according to this invention, where 3A is the particles size distribution of a dispersion as made from wet cake and 3B is the particle size distribution of the same dispersion after high shear mixing.
Figure 3B:
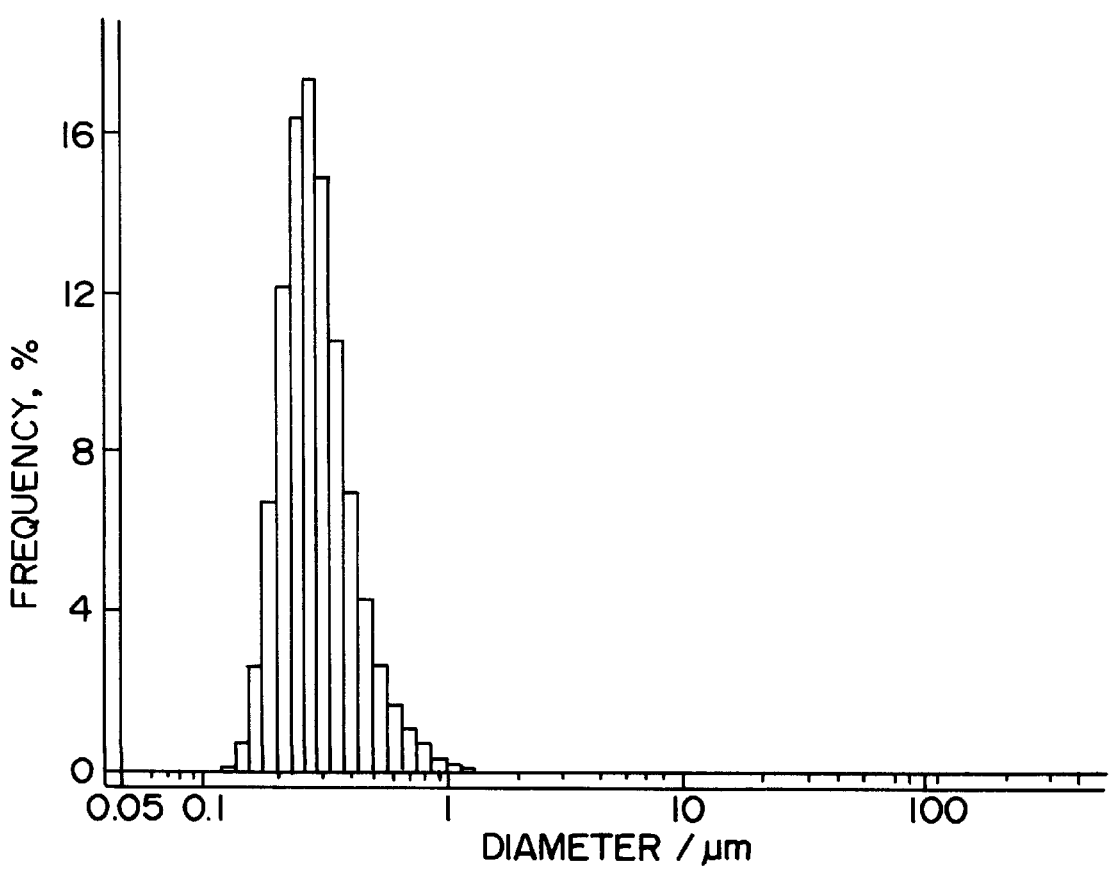
Figure 4:
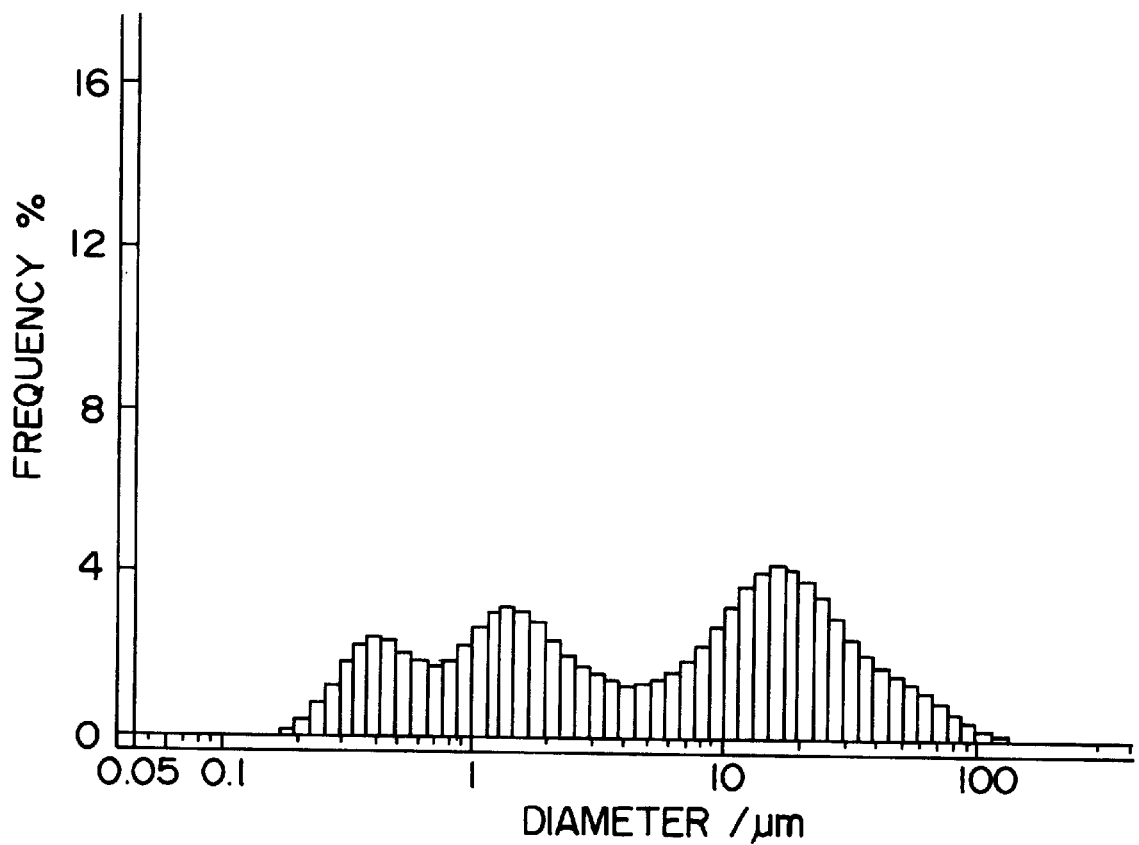
FIG. 4 is a histogram showing the particle size distribution of barium titanate particles according to the prior art comprising strongly agglomerated particles.

The particles of this invention can exist as other than primary particles, e.g. as aggregates of primary particles and/or agglomerates of aggregates of primary particles. SEM is not effective in distinguishing the size distribution among primary particles, aggregates of primary particles and agglomerates of aggregates of primary particles. Thus, particle size distribution analysis, e.g. by light scattering techniques, is a preferred method for characterizing the particle size of the barium titanate-based particles of this invention provided that the preparation for analysis does not include treatment that would change the distribution of aggregated or agglomerated particles, e.g. de-agglomeration due to ultrasonic treatment, high shear mixing or milling. Thus, as used herein the term "particle size" is used to refer to the size of primary particles, aggregates of primary particles and agglomerates of aggregates. A convenient automated light scattering technique employs a Horiba LA-900 laser light scattering particle size analyzer or similar device. Such analysis typically presents the volume fraction, normalized for frequency, of discrete sizes of particles including primary particles, aggregates and agglomerates in ten groupings, i.e. deciles, as illustrated in the histograms of FIGS. 3–5. In more preferred aspects of this invention at least 90 percent of the metal oxide-coated, barium titanate-based particles have a particle size less than 0.8 micrometer or lower, and preferably less than 0.7 micrometer, even more preferably less than 0.6 micrometer. In even more preferred aspects of this invention at least 90 percent of the particles have a particle size less than 0.5 micrometer or lower, and preferably less than 0.4 micrometer, and in some cases even more preferably less than 0.3 micrometer.

Characteristics of particle size distribution include $D_{90}$ which is the smallest particle size in the decile of largest particles, $D_{50}$ which represents the median diameter and $D_{10}$ which is the largest particle size in the decile of smallest particles. The ratio of $D_{90}/D_{10}$ is a convenient characteristic for identifying the width of the particle size distribution curve. In various aspects of this invention the particle size distribution is narrow, preferably having a ratio of $D_{90}/D_{10}$ of less than 4, more preferably less than 3 and in some cases even more preferably less than 2.5.

As used herein the term "dispersion" refers to two phase systems of solid particles suspended in an liquid medium. In a preferred embodiment the stability of the dispersion, i.e. its resistance to settling, can be enhanced by the use of a dispersing agent. A useful dispersing agent for aqueous systems is a charged, water soluble polymer such as a polyacrylic acid.

Except where the context is clear that a metal oxide only is meant, as used herein the term "metal oxide" is used to describe coatings of metal oxides, metal hydroxides, hydrous metal oxides and organic acid salts of a metal. Such organic acid salt can be converted to an oxide or hydroxide, e.g. by thermal decomposition as occurs during heating for ceramic binder burnout and/or ceramic sintering.

As used herein the term "high shear mixing" means mixing in a liquid medium that imparts sufficient energy to separate agglomerates of the coated particles of this invention into smaller particles without the impact of a solid agent such as rods, cylinders or hard spherical media such as zirconia spheres. Hard media is used in certain high shear mixing equipment where small sized media is used to create shear without impacting. Although high shear mixing can be effected by various equipment as described below, it is difficult to precisely define the force applied to separate agglomerates in high shear mixing.

As used herein the term "barium titanate-based" refers to barium titanate, barium titanium having another metal oxide coating and other oxides based on barium and titanate having the general structure $ABO_3$, where A represents one or more divalent metals such as barium, calcium, lead, strontium, magnesium and zinc and B represents one or more tetravalent metals such as titanium, tin, zirconium and hafnium. A preferred barium titanate-based material has the structure $Ba_{(1-x)}A_xO.Ti_{(1-y)}B_yO_2$, where x and y can be in the range of 0 to 1, where A represents one or more divalent metals other than barium such as lead, calcium or strontium and B represents one or more tetravalent metals other than titanium such as tin, zirconium and hafnium. Where the other metals are present as impurities, the value of x and y will be small, e.g. less than 0.1. In other cases, other metal or metals can be introduced to provide a significantly identifiable compound such as barium-calcium titanate, barium-strontium titanate, barium titanate-zirconate and the like. In still other cases where x or y is 1, barium or titanium can be replaced by the other metal of appropriate valence to provide a compound such as lead titanate or barium zirconate. In still other cases the compound can have multiple partial substitutions of barium or titanium. An example of such multiply partial substituted composition is represented by the structural formula

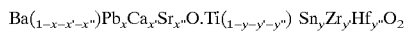

$$Ba_{(1-x-x'-x'')}Pb_xCa_{x'}Sr_{x''}O.Ti_{(1-y-y'-y'')}Sn_yZr_{y'}Hf_{y''}O_2$$

where x, x', x", y, y' and y" are each $\geq 0$ and (x+x'+x") is <1 and (y+y'+y") is <1. In many cases the barium titanate-based material will be disposed with a perovskite crystal structure. In many cases it is preferred that the barium titanate material have a perovskite structure.

It has been discovered that when hydrothermally-produced, barium titanate particles are conventionally dried into powders, the particles form into relatively strongly-agglomerated particles that are not effectively de-agglomerated by simple high shear milling. Thus, dispersions made from such dry, agglomerated, barium titanate-based powders which have a submicron primary particle size require a substantially long duration of impact milling to provide particles in the micron range and longer more intense milling for submicron particles. In contrast, agglomerated metal oxide-coated, barium titanate-based particles in compositions of this invention having a submicron primary particle size, whether in a wet form such as in a slurry, wet cake, dispersion or slip or, even more surprisingly, in a dry powder form, can be de-agglomerated to the submicron size range of the coated particles by the moderate action of high shear mixing of dispersions comprising such particles.

The barium titanate-based particles embodied in the various aspects of this invention can be prepared from hydrothermally-produced, barium titanate-based particles that are not dried but are maintained in a wet environment at least until the particles are provided with a metal oxide coating. Preferably, the hydrothermally-produced barium titanate-based particles are maintained in an aqueous slurry until provided with a metal oxide coating. A slurry of submicron, bariun titanate-based particles can be prepared by a hydrothermal process, e.g. as disclosed in U.S. Pat. Nos. 4,832,939; 4,829,033; and 4,863,833. In such hydrothermal processes an excess amount, e.g. up to about 20 mole percent excess, of barium hydroxide solution is typically added to a hydrous titanium oxide slurry and heated, typically to a temperature in the range of 100 to 200° C., to create submicron particles with perovskite crystalline structure. The particle size and particle size distribution can be manipulated by controlling process variables such as temperatures of slurry and solutions, addition rate and speed of heating to and cooling from the perovskite forming temperature. The selection of process variables for a desired particle product can be readily determined by those skilled in the art following general principles of crystallization. For instance, larger particles can be prepared by adding barium hydroxide relatively slowly to a slurry maintained at a relatively low temperature, e.g. about 35° C.; while smaller particles can be prepared by adding barium hydroxide relatively quickly to a slurry maintained at a relatively high temperature, e.g. about 95° C. Good agitation is important for preparing uniform particles.

After the perovskite structure is imparted to barium titanate particles by thermal treatment of a slurry, the particles are preferably washed to remove unreacted metal species, e.g. barium ions. Washing can be effected with ammoniated de-ionized water at pH 10 to prevent barium from dissolving from the particles. The wash water can be removed by filtration or decanting from settled particles. The number of wash cycles will be determined by the purity desired in the aqueous phase, e.g. to provide a slurry in a low ion solution having a conductivity less than 5 milliSiemens, preferably less than 1 milliSiemens. Four to five washing cycles has been found to be adequate to reduce the ion content of the water phase to a low level characterized by a conductivity of not more than about 100 microSiemens.

The barium titanate-based particles of this invention have a coating comprising an oxide, hydrous oxide, hydroxide or organic acid salt of at least one metal other than barium and titanium. Useful organic acids, due to the low solubility of many of their metal salts, include oxalic acid, citric acid, tartaric acid and palmitic acid. It is believed that the organic acid salt will be converted to a metal oxide during binder burnout. The selection of metal is preferably on the basis of enhancement imparted to the processing or properties of MLC's. The metal in coatings is typically selected from among bismuth, lithium, magnesium, calcium, strontium, scandium, zirconium, hafnium, vanadium, niobium, tantalum, manganese, cobalt, nickel, zinc, boron, silicon, antimony, tin, yttrium, lanthanum, lead and the Lanthanide elements. In preferred aspects of this invention the barium titanate particles have a barium and titanium-free metal oxide coating. When ceramic capacitors with X7R dielectric properties are desired, it is useful to provide the barium titanate particles with dopants such as niobium oxide, tantalum oxide or neodymium oxide in combination with nickel oxide or cobalt oxide. When it is desired to provide ceramic capacitors that are sintered at relatively low temperatures, e.g. in the range of 1000 to 1200° C. as compared to 1300 to 1600° C., it is useful to provide the barium titanate particles with a dopant that promotes low temperature sintering. Such low temperature sintering aids include bismuth oxide, zinc oxide, zinc borate, zinc vanadate, lithium borate and combinations thereof. Dielectric-modifying and sintering temperature-lowering metal oxides can be effectively added to the barium titanate-based particles after the particles have been washed and prior to formation of dispersible wet cake. Metal oxide coatings can be provided by adding to an agitated slurry of barium titanate-based particles an aqueous solution(s) of salts, e.g. nitrates, borates, oxalates, and the like, of metals corresponding to the desired coating. Metal oxide precipitation to the coating is promoted by an appropriate pH, e.g. using ammonium hydroxide. Salt solutions can be added either as one mixture of salt to form a single layer homogenous coating or separately and sequentially to form layers of individual metal oxides. In, the case of metals of relatively higher solubility, e.g. cobalt and nickel, oxide coatings tend to be more difficult to apply and maintain without resolubilization; thus, it is often preferred to apply oxide coatings of these more soluble metals as a top coating over more readily deposited metal oxide layers. An alkaline environment also minimizes solubilization of barium and readily provides particles with a barium and titanium-free metal oxide coating. Metal oxide coatings of particles intended for ceramic capacitor application typically have a thickness less than 10 percent of the diameter of the particle, often less than 20 nanometers thick, and preferably not more than 5 to 10 nanometers thick.

Slurries of metal oxide-coated, barium titanate-based particles are conveniently produced at a relatively low level of solids, e.g. less than 30 wt % barium titanate-based particles. A higher levels of solids, e.g. greater than 30 wt %, is usually preferred for the production of MLC's. Thus, in the case where a slurry of this invention is to be used directly in the manufacture of MLC's, it is useful to concentrate the slurry, e.g. remove water such as by filtration, to at least 40 wt % solids or at least 50 wt %, more preferably at least 55 wt %, and in some cases, even more preferably in the range of at least about 60 or 75 wt % of the particles of this invention. In some cases it may be desirable to replace the aqueous phase with an organic liquid phase, e.g. an alcohol, by solvent exchange. Dispersing agent and binder can be added to concentrated slurry to provide a slip or a stable dispersion of the barium titanate-based particles.

After a metal oxide coating is applied to hydrothermally-produced, barium titanate-based particles, the slurry can be washed and water content of the slurry can be reduced to provide a concentrated slurry, wet cake or powder, e.g. a moist or dry powder. Moreover, slurry, wet cake or powder can be treated with dispersing agent to provide a dispersion or also with binder and other additives to provide a slip. Water is preferably removed by means that avoids or at least minimizes formation of strongly-agglomerated particles, e.g. calcination. Because they are not calcined or dried, certain metal oxides may tend to remain in the form of a hydrated metal oxide which can be soluble if not maintained at a pH near that for minimum solubility point for that metal oxide. For instance, nickel oxide or cobalt oxides tend to be somewhat soluble if not maintained at a pH near 10. Thus, to maintain a properly coated particle, the pH of an aqueous component of the compositions of this invention are preferably maintained in the range of 9 to 11.

Slurry can also be concentrated, e.g. by filtration, to provide a solid wet cake, i.e. a non-flowing solid comprising metal oxide-coated, barium titanate-based particles and liquid. Aqueous wet cake can be in a solid state with as little as about 60 wt % solids mixed with an aqueous solution, e.g. a solid mass of particles in a continuous liquid phase. More preferably, wet cake will comprise at least 65 wt % particles, more preferably at least 70 wt %. Wet cake can comprise up to about 85 wt % particles, more preferably up to about 80 wt % solids, or in some cases as low as 75 wt % particles. In aqueous wet cake the aqueous solution should have a pH greater than 8 to inhibit metal dissolution. A preferred pH range is 8 to 12, more preferably 9 to 11. Such wet cake made from barium titanate-based particles is a colloidal dispersion precursor. That is, the wet cake can be dispersed, e.g. by admixture with a dispersing agent. Little, if any, additional liquid medium is required to transform a wet cake from a solid state into a fluid dispersion.

At least in the case of aqueous wet cake the particles in the cake will remain weakly-agglomerated for a relatively long time as long as the cake is maintained with a water content of at least 15 wt %, more preferably at least 20 wt % or higher, even more preferably at least 25 wt %.

A preferred embodiment of this invention provides wet cake that is storable and transportable. Such wet cake with an extended shelf life is encapsulated in a moisture barrier to inhibit loss of water content that could promote formation of strongly agglomerated particles which are not readily de-agglomerated. Such moisture barrier, e.g. polyethylene bags or polyethylene-coated fiber drums, can provide extended shelf life, e.g. of at least one day or more, e.g. at least 3 days, more preferably longer, e.g. at least 30 days or even more preferably at least 90 days.

Figure 2:
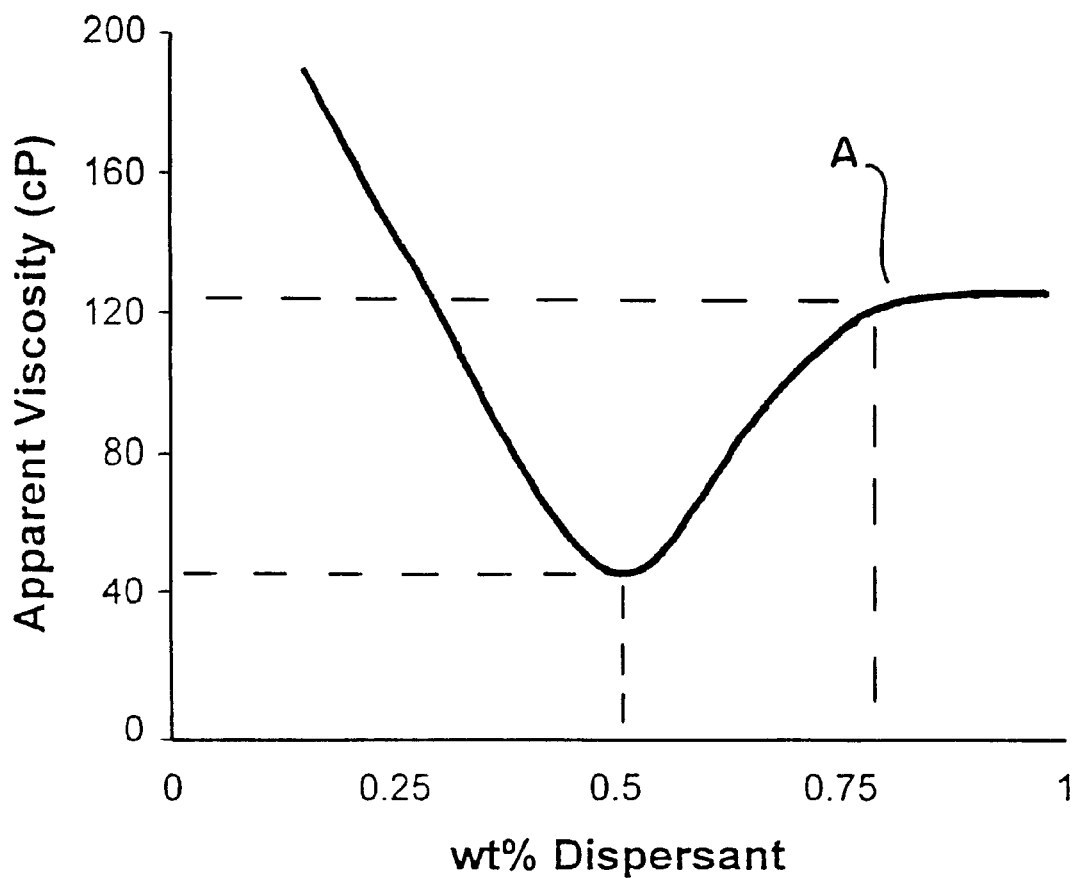
FIG. 2 is an illustration of a titration curve showing the effect of dispersing agent on the viscosity of an embodiment of a dispersion in accordance with this invention.

Solid wet cake of this invention is readily transformed into a fluid dispersion by incorporating into the cake a dispersing agent without a significant addition of aqueous fluid. Although fluid can be added to the cake, the amount of dispersing agent required to transform a solid cake into a fluid dispersion is remarkably small, e.g. typically less than 2 wt %, based on weight of the barium titanate-based material. In some cases no additional fluid other than the fluid volume of the dispersing agent is required to transform a wet cake into a fluid dispersion. Contemplated dispersing agents are polyelectrolytes which include organic polymers with anionic or cationic functional groups. Anionically functionalized polymers include carboxylic acid polymers such as polystyrene sulfonic acid and polyacrylic acid; cationically functionalized polymers include polyimides such as polyetherimide and polyethyleneimine. Polyacrylic acids are preferred for many applications. While polymeric acid groups can be protonated, it is preferable that such acid groups have a counter cation that will avoid reduction of dispersion pH to a level that will promote dissolution of barium or other metal species, e.g. as might be present in dopant coatings. For capacitor applications a preferred cation is the ammonium ion. In some cases, it may be feasible to employ dopant metals as the counter cation for the polymeric acid dispersant. Regardless of the dispersing agent selected the appropriate amount of dispersing agent can be readily determined by those skilled in the art through a process of titration to generate a curve as illustrated in FIG. 2 which shows the effect on dispersion viscosity as a function of the amount of dispersing agent used. When the amount of dispersing agent selected is that amount which provides the lowest viscosity for the dispersion, the concentration of dispersing agent can be reduced on use of the dispersion, e.g. by dilution or interaction with additives, to cause the viscosity to rise to an undesirably high level. Thus, for many applications it is desirable to employ a "viscosity minimizing amount" of dispersing agent which means an amount of dispersing agent that provides a viscosity of the ultimate dispersion in the range of the minimum viscosity and the viscosity at about the shoulder A of the titration curve, as illustrated in FIG. 2.

A preferred dispersing agent for use in colloidal dispersions intended for capacitor applications and for such testing has been found to be an ammoniated polyacrylic acid having a number average molecular weight of about 8000. For instance, 0.75 wt % of such ammoniated polyacrylic acid (as a 40 wt % aqueous solution) has been found to be useful for transforming wet cake into a liquid dispersion. The incorporation of dispersing agent can be done by convenient means such as mechanically blending dispersant into the wet cake. When high shear mixing is employed, excess dispersing agent is consumed by new particle surface area exposed by de-agglomeration. Thus, it may be convenient to add dispersing agent incrementally in the course of high shear mixing.

Wet cake is distinguished from slurries, dispersions, slips and dry powders in that wet cake is a non-flowing solid while slurries, dispersions and slips are fluid liquids and dry powders are flowing solids. Moist powders may or may not flow depending on the amount of liquid present. As more water is removed moist powder becomes progressively drier. It is understood, however, that dry powder is not necessarily totally dehydrated. Spray drying, freeze drying and low temperature vacuum-assisted drying are preferred methods for providing dry powders of metal oxide-coated, barium titanate-based particles which remain dispersible merely by mixing into dispersing agent-containing, aqueous solution, e.g. with high shear mixing. Thus, dry powders of metal oxide-coated, barium titanate-based particles of this invention are surprisingly dispersible into dispersions of submicron particles without the need for long duration, impact milling, e.g. impact rod milling or vibratory milling. Unlike prior art materials, high energy milling for several hours is not required to reduce the particle size to a point where dispersions or slips of the metal oxide-coated, barium titanate-based particles of this invention can be used to make capacitors with fine grained, thin dielectric layers and high breakdown voltage.

Another aspect of this invention provides methods of making a dispersion of submicron, metal oxide-coated, barium titanate-based particles in an aqueous solution by de-agglomerating a dispersion of large (greater than 1 $\mu$m), weakly-agglomerated metal oxide-coated, barium titanate-based particles until substantially all of said particles less than 1 $\mu$m or smaller. In a preferred method of this invention high solids dispersions, e.g. comprising from about 30 to 75 wt % particles, are de-agglomerated by high shear mixing with a dispersing agent. The optimal time for high shear mixing is readily determined by routine experimentation. High shear mixing can be effected in a centrifugal pumping de-agglomerating mill as available from Silverson Machine Inc. of East Longmeadow, Mass. Other apparatus useful for providing the de-agglomerated dispersions of this invention include what is known as supermills, colloid mills and cavitation mills. Supermills as available from Premier Mill of Reading, Pa. have a media-filled milling chamber with high speed, rotating discs on a central shaft. Colloid mills as available from Premier Mill of Reading, Pa. have a grinding gap between extended surfaces of a high speed rotor and a fixed stator. In cavitation mills as available from Arde Barinco Inc. of Norwood, N.J., fluid is pumped through a series of rapidly opening and closing chambers that rapidly compress and decompress the fluid imparting a high frequency shearing effect that can de-agglomerate particles. It is expected that concentrated slurry, dispersions, wet cake, moist powder or dry powder will perform equally well in providing slips for manufacture of high performance capacitors of this invention, with a preference for dispersions, cakes or powders depending on unique capacitor manufacturing facilities or methods.

A defining test for weakly-agglomerated metal oxide-coated barium titanate-based particles of this invention comprises using a Silverson Model L4R high shear laboratory mixer equipped with a square hole high shear screen to high shear mix a 500 g sample of a dispersion comprising 70 wt % of the coated particles in an alkaline aqueous solution at a temperature in the range of 25 to 30° C. and a pH at which the coating will not dissolve and containing an effective amount of dispersing agent for an effective time for de-agglomerating coated particles. An effective amount of dispersing agent is sufficient to maintain separated agglomerates and aggregates in the smaller particle sizes without re-agglomeration. An effective amount of dispersing agent will vary depending on factors such as the size of particles, the nature of the coating and the power of the dispersing agent. An effective amount of dispersing agent and effective time can be readily determined with a few routine experiments by those skilled in the art observing the effect of those variables, i.e. concentration of dispersing agent and high shear mixing time, on reducing the magnitude of particle size distribution. An effective amount of those variables will allow a particle size analysis that reflects the true effect of high shear mixing on de-agglomeration. For many cases it had been found that an effective amount of ammoniated polyacrylic acid dispersing agent (number average molecular weight of about 8000) is 1 wt % dispersing agent per total weight of particles and dispersing agent and an effective high shear mixing time is 1 minute.

In certain aspects of this invention metal oxide-coated, barium titanate-based particles prepared by hydrothermal processes are, as illustrated by reference to the photomicrograph of FIG. 1, substantially spherical, i.e. equiaxed in appearance as opposed to having an irregular shape and/or angular surfaces common to milled and/or calcination-derived particles. Such particles remain substantially spherical even after size reduction by high shear mixing. Occasionally, substantially spherical particles may be twinned, i.e. joined particles that grew together. The occurrence of such twinned particles is desirably rare. The use of spherical particles, as compared to non-spherical milled powders, provides powders characterized with exceptionally high surface area, e.g. BET surface area of at least 4 square meters per gram ($m^2/g$), or higher e.g. at least 8 $m^2/g$ or even higher, about 12 $m^2/g$.

Submicron, metal oxide-coated, barium titanate particles of this invention are suspendable with a wide variety of binders, dispersants and release agents using aqueous or non-aqueous solvents to provide ceramic casting slips. When used in the manufacture of ceramic capacitors, the barium titanate-based particles of this invention are conveniently dispersed, e.g. with ammoniated polyacrylic acid dispersing agent, at 50 to 80 wt % solids, in aqueous solution with from 5 to 20 wt % of dissolved or suspended, film-forming, polymeric binder to provide a slip. The film-forming polymeric binders which are popular for use in the ceramic arts are polyvinyl acetate, polyvinylchloride, poly(vinyl acetate/vinyl chloride), polyvinyl butyral, polystyrene, polymethacrylates. In some aqueous systems it is preferred to employ an emulsion of a latex binder, e.g. poly(acrylate), polystyrene acrylate), polyacrylonitrile aciylate, polyvinylchloride, polystyrene, poly(styrenebutadiene) and carboxylated poly(styrene butadiene), e.g. as disclosed in U.S. Pat. No. 4,968,460, incorporated herein by reference. For aqueous systems, emulsions of water-insoluble polymers or water soluble polymers, e.g. polyvinyl alcohol, are preferred.

When non-aqueous slips are preferred, the barium titanate-based particles are dispersed in an organic solvent containing dissolved polymeric binder and, optionally, other dissolved materials such as plasticizers, release agents, dispersing agents, stripping agents, antifouling agents and wetting agents. Useful organic solvents have low boiling points and include benzene, methyl ethyl ketone, acetone, xylene, methanol, ethanol, propanol, 1,1,1-trichloroethane, tetrachloroethylene, amyl acetate, 2,2,4-triethyl pentanediol-1,3-monoisobutyrate, toluene, methylene chloride, turpentine and mixtures with water such as methanol/water mixtures. Among the polymeric materials useful in non-aqueous slips are poly(vinyl butyral), poly(vinyl acetate), poly(vinyl alcohol), cellulosic polymers such as methyl cellulose, ethyl cellulose, hydroxyethyl cellulose, methylhydroxyethyl cellulose, polypropylene, polyethylene, silicon polymers such as poly(methyl siloxane) and poly(methylphenyl siloxane), polystyrene, butadiene/styrene copolymer, poly(vinyl pyrollidone), polyamides, polyethers, poly (ethylene oxide-propylene oxide), polyacrylamides, and acrylic polymers such as sodium polyacrylate, poly(methyl acrylate), poly(methyl methacrylate) and copolymers such as copolymers of ethyl methacrylate and methyl acrylate. A preferred acrylate polymer is Acryloid B-7 available from Rolum & Haas Company. Useful dispersing agents for organic solvent suspensions and slips include menhadden oil, corn oil, polyethyleneimine and ammoniated polyacrylic acid.

Polymeric binder is useful in the range of 5 to 20 wt %. Frequently, the organic medium will also contain a small amount of a plasticizer to lower the glass transition temperature (Tg) of the binder polymer. The choice of plasticizers is determined primarily by the polymer which must be modified and can include phthalate esters such as diethyl phthalate, dibutyl phthalate, dioctyl phthalate, butyl benzyl phthalate, alkyl phosphates, polyethylene glycol, glycerol, poly(ethylene oxides), hydroxyethylated alkyl phenol, dialkyldithiophosphonate and poly(isobutylene).

To prepare dispersions in organic solvent, it is preferable to remove water from an aqueous wet cake of barium titanate-based particles, e.g. in a vacuum oven at 200° C., followed by coarse screening, e.g. at 100 mesh. Useful suspensions can be prepared by high shear mixing barium titanate particles in a mixture organic solvent and dispersing agent. Polymeric binder and plasticizer can be added before or after high shear mixing. In one embodiment an organic solvent-based slip of the invention comprises per 100 parts by weight of barium titanate-based particles:

25 to 40 parts of organic solvent, 2 to 5 parts of dispersing agnet, 5 to 20 parts of polymeric binder, and 0 to 15 parts of plasticizer.

With both aqueous and organic solvent-based slips, green tapes can be formed onto carrier surfaces by methods known to the skilled artisan. See, for example, J. C. Williams at page 173–197 of Ceramic Fabrication Processes, Volume 9 of Treatise on Materials Science and Technology, Academic Press (1976) and U.S. Pat. Nos. 3,717,487 and 4,640,905 both of which are incorporated herein by reference.

Moreover, there exists a variety of techniques for converting slips into thin films, green layers and fired ceramics. It is believed that the dispersions of this invention will find application, with minor modification, e.g. selection of preferred suspension medium and binder, dilution to a desired fluid viscosity, etc., in the various ceramic processes for making dielectric layers for MLC's. Slips can be formed into films by spraying, layering onto a moving sheet from a waterfall or die (such as a doctor blade) and other methods used in the MLC industry. When sufficient water is removed from the film, a cohesive, solid "green" film is provided which can be coated in a registered pattern on one or both sides with a conductor material or conductive material precursor, e.g. ink containing fine particles of palladium, silver, nickel or alloys of palladium and silver. Such conductive inks can contain fine particles of the metal and ceramic. Sheets of green film are typically stacked, e.g. up to 250 layers or more, and diced into MLC-sized cubes which are fired to burn out polymeric binder and dispersant and sintered to form a dense multilayer capacitor structure with fine grain structure dielectric layers. Conductive metal applied to the ends can connect the alternating conductive interlayers forming the MLC.

The unique particle size properties of barium titanate-based particles of this invention are expected to allow the production of novel MLC's, e.g. having ultrathin layers of dielectric ceramic having submicron grains. Such dielectric materials should facilitate significant increases in volumetric capacitance. Moreover, it is expected that MLC's will have unexpectedly high breakdown voltage. The absence of large, e.g. greater than 1 $\mu$m, particles should allow for the commercial production at high yields, e.g. greater than 98%, of MLC's comprising multiple, e.g. greater than 40, dielectric layers. The particles of this invention are expected to be preferably used to produce MLC's having a dielectric ceramic layer with a maximum grain size is 0.9 $\mu$m or less, e.g. 0.8 $\mu$m of even smaller, say 0.7 $\mu$m. Another aspect of this invention provides X7R capacitors comprising more than 20 dielectric layers of barium titanate-based material sintered into ceramic structure wherein said layers are less than 5 $\mu$m thick, e.g. in the range of 2 to 4 $\mu$m thick. A higher number of dielectric layers, e.g. 250 or 500, may be preferred depending on MLC design. Thin dielectric layers allow MLC's with an increased number of dielectric layers to be used in a standard sized MLC or MLC's with a fixed number of layers to fit in a smaller sized package. The result is that the capacitance of standard sized MLC package can be readily increased by a factor of 5 to 10 or more.

For providing monolithic X7R MLC's the particles used to make the dielectric are preferably coated with oxides of niobium, cobalt, nickel and manganese. For low fire capability, e.g. sintering at below 1200° C., a preferred metal oxide coating can also contain bismuth oxide. To achieve ultrathin dielectric layers with a thickness less than 4 micrometers, the particles preferably have a primary particle size less than 0.3 micrometers, e.g. in the range of 0.1 to 0.2 micrometers. A uniform, fine grain size, e.g. less than 0.3 micrometers, in ultrathin dielectric layers provides superior dielectric strength in excess of 100 volts per micrometer and low dissipation factor. These properties provide increased reliability for high capacitance, high voltage ceramic capacitors. The ability to provide thin dielectric layers has allowed the production of capacitors having 5 to 10 times the capacitance for a standard case size. Such MLC's preferably comprise a monolithic ceramic body, e.g. of metal oxide-doped barium titanate, two groups of interdigitated electrodes buried in said body and extending respectively to opposites ends of said body, and two conductive terminations contacting said two groups respectively at said opposite ends. MLC's with X7R characteristics have a temperature coefficient of capacitance over a temperature range of −55° C. to 125° C. which does not vary by more than ±15% from the capacitance at 25° C. In a preferred aspect of this invention the ceramic in an X7R MLC has a grain size of less than 0.3 micrometers and comprises 93 to 98 weight percent of the barium titanate-based ceramic and 2 to 7 weight percent of other metal oxides.

The following examples illustrate the preparation of certain embodiments of various aspects of this invention but are not intended as setting forth limitations to the scope of this invention.

EXAMPLE 1

This example illustrates one hydrothermal processing method of preparing a slurry of barium titanate-based particles which is useful for preparing the coated barium titanate-based particles of this invention. An aqueous solution of 37 wt % titanium oxychloride ($TiOCl_2$) was diluted by mixing with about 9 parts of water in a reactor; ammonium hydroxide was titrated in to pH 4 to provide a thick white gel. The soluble ammonium chloride was removed by filtration, followed by washing with hot de-ionized water and reslurrying to provide a slurry of hydrous titanium oxide at 85° C. and a concentration of about 4.2 wt % as titanium dioxide. A solution of about 25 wt % barium hydroxide was prepared dissolving barium hydroxide octahydrate in 95° C. water. Excess barium hydroxide solution (120 mole percent) was added to the titanium oxide slurry over a period of about 9 minutes, followed by heating to a temperature of about 200° C. to form submicron perovskite barium titanate particles with a narrow size distribution and equiaxed morphology. The slurry was cooled to below 100° C. and washed with about 400 liters of ammoniated de-ionized water (pH 10). The wash water was decanted followed by 4 more washings until the conductivity of the wash water was below 100 microSiemens. The resulting low conductivity slurry contained barium titanate particles principally in the form of agglomerates of substantially spherical primary particles where the typical agglomerate particle size as determined by SEM was in the range of about 10 micrometers; the primary particles size as determined by SEM was about 0.15 micrometer. Such slurries are useful source materials for applying metal oxide coatings to provide metal oxide-coated barium titanate-based particles of this invention.

EXAMPLE 2

To illustrate the effect of high shear mixing on barium titanate particles without a metal-oxide coating, a slurry produced in the manner of Example 1 was concentrated in a filter press at a 1000 kPa (150 psi) pressure drop to provide a wet cake containing about 72 wt % solids. The cake was dispersed in a blender with polyacrylic acid (8000 number average molecular weight) as dispersing agent in an amount to provide 0.75 g of polyacrylic acid per 100 g of barium titanate. The resulting dispersion had a particles size distribution with a $D_{90}$ of 1.8 µm. After a 500 g sample of the original resulting dispersion was treated for 1 minute with a Silverson Model L4R high shear laboratory mixer equipped with a square hole high shear screen operating at about 8000 rpm, the $D_{90}$ value was 2.1 µm

EXAMPLE 3

This example illustrates the preparation of one embodiment of metal oxide-coated, barium titanate-based particles of this invention. A slurry was prepared essentially in the manner of Example 1, containing about 22 kg of barium titanate particles and 200 liters of ammoniated de-ionized water at pH 10. A 1 gram-mole/kilogram (1 molal) solution of bismuth nitrate in 2 molal nitric acid was added to the slurry in an amount to provide 3 g bismuth per 100 g barium titanate concurrently with a solution of 29 wt % ammonium hydroxide in an amount to maintain the slurry at pH 10. A bismuth oxide coating readily formed on the barium titanate particles. After addition of the bismuth solution, a solution of niobium bioxalate (about 5 wt % as niobium with excess oxalic acid) was added to the slurry of bismuth coated particles in an amount to provide 1.5 g of niobium per 100 g of barium titanate concurrently with a solution of 29 wt % ammonium hydroxide in an amount to maintain the slurry at pH 10. A niobium oxide coating readily formed on the particles. After addition of the niobium solution, the slurry was washed with ammoniated water and re-slurried in 200 liters of ammoniated water at pH 10. A solution of 1 molal cobalt nitrate in water was added in an amount to provide about 0.18 g of cobalt per 100 g of barium titanate. A coating of cobalt oxide was formed on the particles. The slurry was washed several times with ammoniated water and filtered to provide a wet cake containing about 72 wt % of metal oxide-coated, barium titanate-based particles in a continuous phase of aqueous solution at pH 9–10. The wet cake was dispersed using ammoniated polyacrylic acid essentially in the manner of Example 2 to provide a dispersion of the metal oxide-coated, barium titanate particles, more than 95 wt % of which passed through a 10 micrometer nylon mesh screen. The particle size distribution of such particles is illustrated by the histogram of FIG. 3A. Particle size analysis indicated the median diameter $D_{50}$ was 0.64 micrometers, $D_{10}$ was 0.37 micrometers and $D_{90}$ was 1.2 micrometers. The narrow particle size distribution is indicated by the ratio of $D_{90}/D_{10}$ of about 3. A sample of the dispersion was treated by high shear mixing essentially in the manner of Example 2 to reduce the size of agglomerated particles. The particle size distribution of the high shear mixed dispersion is illustrated by the histogram of FIG. 3B. Particle size analysis indicated the median diameter was reduced to 0.28 micrometers, with $D_{10}$ being 0.20 micrometers and $D_{90}$ being 0.46 micrometers. The narrow particle size distribution is indicated by the ratio of $D_{90}/D_{10}$ of about 2. About 1.2 g of a high solids dispersion (70 wt % solids) of the particles was cast into a 12.5 millimeter (mm) plastic tube placed over a porous, plaster of paris mold and allowed to dry in a high humidity chamber for 24 hours. A dried disk (12.5 mm in diameter by 2 mm thick) was separated from the mold and sintered at 1125° C. for 2 hours to 94% theoretical density (5.64 g/cc). The sintered barium titanate-based ceramic disk had a dielectric constant at 25° C. of 2105. X7R characteristics was indicated as the thermal change in capacitance (TCC) from −55° C. to 125° C. was within the ±15% specification; TCC was −6.28 at −55° C. and 3.45 at 125° C.

EXAMPLE 4

This example comparatively illustrates the presence of strongly agglomerated particles in dispersions prepared from dried, hydrothermally-derived, barium titanate particles as available in the prior art. A slurry of submicron, barium titanate particles was prepared essentially in the manner of Example 1 except that the slurry was filtered and dried to provide a dry powder. About 22 kg of powder was then reslurried in 200 liters of de-ionized water, ammoniated to pH 10 and then doped with a metal oxide coating according to the method described in Example 3. The slurry was pressed to form a wet cake at 72 wt % solids and dried. The metal oxide-coated powder was subsequently dispersed in an aqueous solution with polyacrylic acid dispersing agent to provide a dispersion of large (greater than 10 µm) agglomerates of strongly agglomerated particles. Substantially all of the barium titanate particles were agglomerated to a size that would be retained on a 10 micrometer nylon mesh screen. After high shear mixing substantially all of the barium titanate particles were retained on a 5 micrometer nylon mesh screen, indicating strongly agglomerated particles, e.g. the drying of powders promotes agglomeration of particles with a relatively high interparticle bond strength which are not de-agglomerated by high shear mixing. Particle size analysis indicated a trimodal distribution with peaks at about 0.3, 1.2 and 12 micrometers, with a $D_{10}$ of about 0.5 micrometers, a $D_{50}$ of about 6.4 micrometers and a $D_{90}$ of about 35 micrometers as illustrated by the histogram of FIG. 4. The wide particle size distribution is further characterized by a ratio of $D_{10}/D_{90}$ of 70.

EXAMPLE 5

Figure 5A:
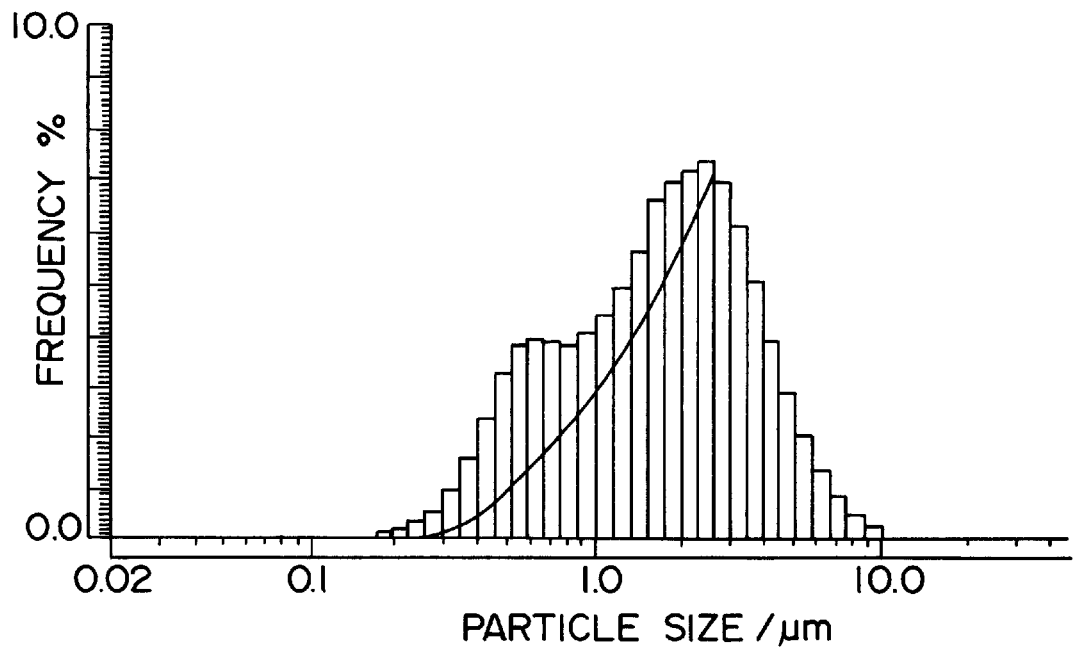
FIGS. 5A and 5B are histograms showing particle size distribution of an embodiment of barium titanate particles according to this invention, where 5A is the particles size distribution of a dispersion as made from wet cake and 5B is the particle size distribution of the same dispersion after high shear mixing.
Figure 5B:
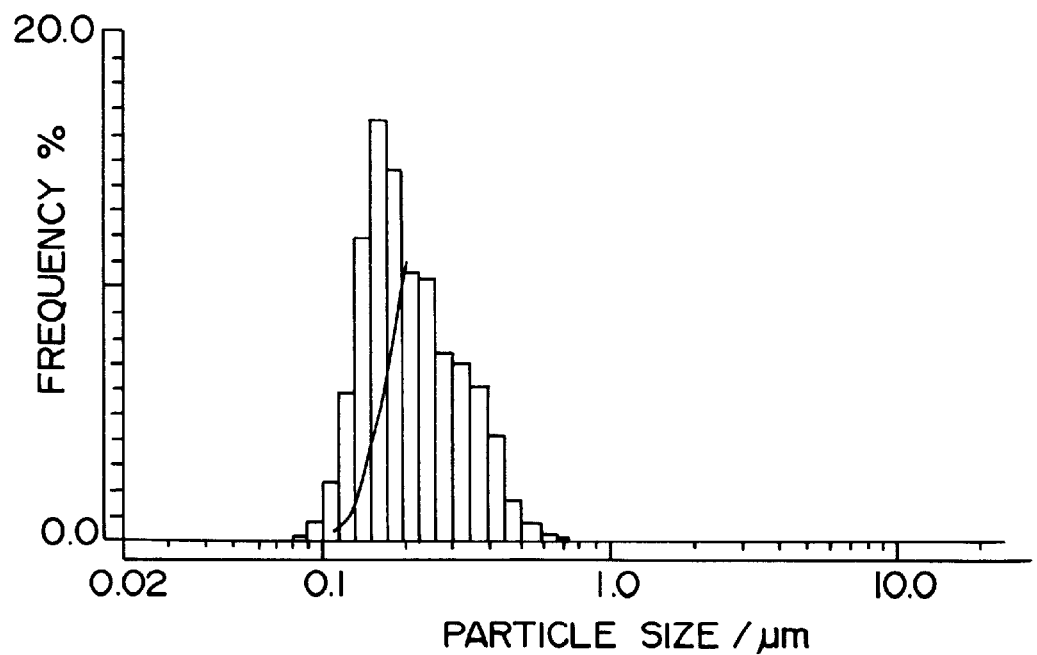

This example further illustrates the preparation of a dispersion of metal oxide-coated, barium titanate-based particles according to this invention. A dispersion of metal oxide-coated, barium titanate particles was prepared from wet cake essentially in the manner of Example 3 and determined to have a particle size distribution as illustrated in the histograph of FIG. 5A where $D_{10}$ was 0.525 micrometers, $D_{50}$ was 1.7 micrometers and $D_{90}$ was 4.1 micrometers. A volume of 3.8 liters (1 gallon) of the dispersion was treated by high shear mixing for 45 minutes in a Premier Mill supermill model HM-1.5 with recirculation at a flow rate of 30 gallons per minute; the mill was filled with yttrium-doped zirconia milling media, 0.65 millimeters in diameter. The particle size of the agglomerates was reduced to a particle size distribution as illustrated in the histograph of FIG. 5B where $D_{10}$ was 0.13 micrometers, $D_{50}$ was 0.19 micrometers and $D_{90}$ was 0.36 micrometers. Dielectric ceramic structure made from such dispersions had a grain size in the range of 0.2 to 0.3 μm.

EXAMPLE 6

This example illustrates the production of another embodiment of metal oxide-coated, barium titanate-based particles according to this invention. Wet cake produced essentially in the manner of Example 3 was dried for 24 hours in a vacuum oven at 200° C. and −100 kiloPascal vacuum to provide a dispersible powder of metal oxide-coated, barium titanate-based powder. The powder was dispersed by mixing into an aqueous solution comprising 72 wt % solids and 0.75 wt % ammoniated polyacrylic acid dispersing agent. The dispersion had a particle size distribution with a $D_{90}$ of 1.9 μm. The agglomerated particles in the dispersion were reduced in size by high shear mixing for 1 minute in a Silverson Model L4R high shear laboratory mixer to provide a colloidal dispersion with a $D_{90}$ of 0.6 μm.

EXAMPLE 7

This example comparatively illustrates the inability of metal oxide-coated barium titanate powder of the prior art to be de-agglomerated by high shear mixing. A metal oxide-coated, barium titanate available from Degussa Corporation as X7R MLC Dielectric Powder AD302L (identified as having a particle size distribution with 90% less than 1.2 μm) was dispersed in a dispersing agent-containing aqueous solution essentially in the manner of Example 6. The dispersed particles had a $D_{90}$ of 1.8 μm and $D_{50}$ of 1.1 μm. After high shear mixing in a Silverson Model L4R high shear laboratory mixer for 1 minute, $D_{90}$ and $D_{50}$ were unchanged. After high energy milling for 2 hours in a vibratory mill, $D_{90}$ was reduced to 1.2 μm and $D_{50}$ was reduced to 0.7 μm.

EXAMPLE 8

This example illustrates MLC's prepared from barium titanate-based particles of this invention. A dispersion of metal oxide-coated, barium titanate particles prepared essentially in the manner of Example 3 was mixed with a polymeric binder and cast into thin films of several different thickness which was dried into green tapes. The green tapes were coated with an electrically conductive ink in an appropriate pattern, cut into slices and stacked, diced and fired at 1125° C. forming MLC's having 40 ceramic dielectric layers of about 3.5, 4.2 and 7.2 μm thick. The 40 Layer MLC Properties are set forth in the following table where TCC is the thermal coefficient of capacitance.

40 Layer MLC Properties

| | dielectric layer thickness | | |
|---|---|---|---|
| | 7.2 μm | 4.2 μm | 3.5 μm |
| Dielectric constant | 2265 | 2410 | 2260 |
| Breakdown voltage | 680 v | 520 v | 440 v |
| TCC @ −55 ° C. | −2.2% | −6.2% | −15.% |
| TCC @ 125 ° C. | −7.8% | −14.% | −2.4% |

With the foregoing examples serving to illustrate a limited number of embodiments the full scope and spirit of the invention is set forth in the following claims.

We claim:

1. A dispersion of barium titanate-based particles, the barium titanate-based particles having a coating comprising a metal oxide, metal hydrous oxide, metal hydroxide or organic acid salt of a metal other than barium or titanium, wherein the dispersion includes greater than 30 percent by weight of said coated particles and at least 90 percent of said dispersed coated particles have a particle size less than 0.9 micrometer.

2. The dispersion of barium titanate-based particles according to claim 1 wherein said dispersed coated particles have a primary particle size less than 0.6 micrometer.

3. The dispersion of barium titanate-based particles according to claim 1 wherein said dispersed coated particles have a primary particle size less than 0.5 micrometer.

4. The dispersion of barium titanate-based particles according to claim 1 wherein said dispersed coated particles have a primary particle size less than 0.4 micrometer.

5. The dispersion of barium titanate-based particles according to claim 1 wherein said dispersed coated particles have a primary particle size less than 0.3 micrometer.

6. The dispersion of barium titanate-based particles according to claim 1 wherein said dispersed coated particles have a primary particle size less than 0.2 micrometer.

7. The dispersion of barium titanate-based particles according to claim 1 wherein said dispersed coated particles have a particle size distribution decile ratio of $D_{90}/D_{10}$ less than 4.

8. The dispersion of barium titanate-based particles according to claim 1 wherein said dispersed coated particles have a particle size distribution decile ratio of $D_{90}/D_{10}$ less than 3.

9. The dispersion of barium titanate-based particles according to claim 1 wherein said dispersed coated particles have a particle size distribution decile ratio of $D_{90}/D_{10}$ less than 2.5.

10. The dispersion of barium titanate-based particles according to claim 1 wherein at least 90 percent of said coated particles have a particle size less than 0.8 micrometer when said particles are dispersed by high shear mixing.

11. The dispersion of barium titanate-based particles according to claim 1 wherein at least 90 percent of said coated particles have a particle size less than 0.7 micrometer when said particles are dispersed by high shear mixing.

12. The dispersion of barium titanate-based particles according to claim 1 wherein at least 90 percent of said coated particles have a particle size less than 0.6 micrometer when said particles are dispersed by high shear mixing.

13. The dispersion of barium titanate-based particles according to claim 1 wherein at least 90 percent of said coated particles have a particle size less than 0.5 micrometer when said particles are dispersed by high shear mixing.

14. The dispersion of barium titanate-based particles according to claim 1 wherein at least 90 percent of said coated particles have a particle size less than 0.4 micrometer when said particles are dispersed by high shear mixing.

15. The dispersion of barium titanate-based particles according to claim 1 wherein at least 90 percent of said coated particles have a particle size less than 0.3 micrometer when said particles are dispersed by high shear mixing.

16. The dispersion of barium titanate-based particles according to claim 1 wherein substantially all of said dispersed coated particles are equiaxed or spherical.

17. The dispersion of barium-titanate based particles according to claim 1 comprising at least 50 weight percent of said dispersed coated particles.

18. The dispersion of barium titanate-based particles according to claim 17 further comprising between 3 and 20 weight percent of a binder composition comprising a dissolved or suspended, film-forming, polymer.

19. A wet cake comprising the dispersion of barium titanate-based particles according to claim 1 including between 15 and 35 weight percent of an aqueous liquid.

20. The wet cake of claim 19 further comprising a moisture barrier that provides shelf life such that after 30 days said wet cake is dispersible by the admixture of a dispersing agent by high shear mixing into an aqueous dispersion of the coated particles, 90 percent of which have a particle size less than 1 micrometer.

21. The dispersion of claim 1, wherein the coating includes more than one chemically distinct layer, each layer comprising a metal oxide, metal hydrous oxide, metal hydroxide or organic acid salt of a metal other than barium or titanium.

22. The dispersion of claim 1, wherein said dispersed coated particles are non-milled.

23. The dispersion of claim 1, wherein the coating covers a major portion of the surface of said dispersed coated particles.

24. The dispersion of claim 1, wherein the dispersion includes greater than 40 percent by weight of said dispersed coated particles.

25. A dispersion of barium titanate-based particles, the barium titanate-based particles having a primary particle size less than 0.6 micrometer and a coating comprising an oxide, hydrous oxide, hydroxide or organic acid salt of at least one metal selected from the group consisting of lithium, magnesium, calcium, strontium, scandium, zirconium, hafnium, vanadium, niobium, tantalum, manganese, cobalt, nickel, zinc, boron, silicon, antimony, tin, yttrium, lanthanum, lead, bismuth and a Lanthanide element, wherein the dispersion includes greater than 30 percent by weight of said coated particles and at least 90 percent of said dispersed coated particles have a particle size less than 0.9 micrometer.

26. The dispersion of barium titanate-based particles according to claim 25 wherein said dispersed coated particles have a primary particle size less than 0.5 micrometer.

27. The dispersion of barium titanate-based particles according to claim 25 wherein said dispersed coated particles have a primary particle size less than 0.4 micrometer.

28. The dispersion of barium titanate-based particles according to claim 25 wherein said dispersed coated particles have a primary particle size less than 0.3 micrometer.

29. The dispersion of barium titanate-based particles according to claim 25 wherein said dispersed coated particles have a primary particle size less than 0.2 micrometer.

30. The dispersion of barium titanate-based particles according to claim 25 wherein said dispersed coated particles have a particle size distribution decile ratio of $D_{90}/D_{10}$ less than 4.

31. The dispersion of barium titanate-based particles according to claim 25 wherein said dispersed coated particles have a particle size distribution decile ratio of $D_{90}/D_{10}$ less than 3.

32. The dispersion of barium titanate-based particles according to claim 25 wherein said dispersed coated particles have a particle size distribution decile ratio of $D_{90}/D_{10}$ less than 2.5.

33. The dispersion of barium titanate-based particles according to claim 25 wherein at least 90 percent of said coated particles have a particle size less than 0.8 micrometer when said particles are dispersed by high shear mixing.

34. The dispersion of barium titanate-based particles according to claim 25 wherein at least 90 percent of said coated particles have a particle size less than 0.7 micrometer when said particles are dispersed by high shear mixing.

35. The dispersion of barium titanate-based particles according to claim 25 wherein at least 90 percent of said coated particles have a particle size less than 0.6 micrometer when said particles are dispersed by high shear mixing.

36. The dispersion of barium titanate-based particles according to claim 25 wherein at least 90 percent of said coated particles have a particle size less than 0.5 micrometer when said particles are dispersed by high shear mixing.

37. The dispersion of barium titanate-based particles according to claim 25 wherein at least 90 percent of said coated particles have a particle size less than 0.4 micrometer when said particles are dispersed by high shear mixing.

38. The dispersion of barium titanate-based particles according to claim 25 wherein at least 90 percent of said coated particles have a particle size less than 0.3 micrometer when said particles are dispersed by high shear mixing.

39. The dispersion of barium titanate-based particles according to claim 25 wherein substantially all of said dispersed coated particles are equiaxed or spherical.

40. The dispersion of barium titanate-based particles according to claim 25, comprising at least 50 weight percent of said dispersed coated particles.

41. The dispersion of barium titanate-based particles according to claim 40 further comprising between 3 and 20 weight percent of a binder composition comprising a dissolved or suspended, film-forming, polymer.

42. A wet cake comprising the dispersion of barium-titanate based particles according to claim 25 including between 15 and 35 weight percent of an aqueous liquid.

43. The wet cake of claim 42 further comprising a moisture barrier that provides shelf life such that after 30 days said wet cake is dispersible by the admixture of a dispersing agent by high shear mixing into an aqueous dispersion of the coated particles, 90 percent of which have a particle size less than 1 micrometer.

44. The dispersion of claim 25, wherein the dispersion includes greater than 60 percent by weight of said dispersed coated particles.

45. The dispersion of claim 25, wherein the coating includes more than one chemically distinct layer, each layer comprising a metal oxide, metal hydrous oxide, metal hydroxide or organic acid salt of a metal other than barium or titanium.

46. The dispersion of claim 25, wherein said dispersed coated particles are non-milled.

47. The dispersion of claim 25, wherein the coating covers a major portion of the surface of said dispersed coated particles.

48. The dispersion of claim 25, wherein the dispersion includes greater than 40 percent by weight of said dispersed coated particles.

49. A dispersion of non-milled barium titanate-based particles, the non-milled barium titanate-based particles having a coating comprising a metal oxide, metal hydrous oxide, metal hydroxide or organic acid salt of a metal other than barium or titanium, wherein the dispersion includes greater than 30 percent by weight of said coated particles and at least 90 percent of said dispersed coated non-milled particles have a particle size less than 0.9 micrometer when said coated non-milled barium titanate-based particles are dispersed by high shear mixing.

50. The dispersion of non-milled barium titanate-based particles according to claim 49 wherein said dispersed coated particles have a primary particle size less than 0.6 micrometer.

51. The dispersion of non-milled barium titanate-based particles according to claim 49 wherein said dispersed coated particles have a primary particle size less than 0.5 micrometer.

52. The dispersion of non-milled barium titanate-based particles according to claim 49 wherein said dispersed coated particles have a primary particle size less than 0.4 micrometer.

53. The dispersion of non-milled barium titanate-based particles according to claim 49 wherein said dispersed coated particles have a primary particle size less than 0.3 micrometer.

54. The dispersion of non-milled barium titanate-based particles according to claim 49 wherein said dispersed coated particles have a primary particle size less than 0.2 micrometer.

55. The non-milled barium titanate-based particles according to claim 49 wherein said dispersed coated non-milled particles have a particle size distribution decile ratio of $D_{90}/D_{10}$ less than 4.

56. The dispersion of non-milled barium titanate-based particles according to claim 49 wherein said dispersed coated non-milled particles have a particle size distribution decile ratio of $D_{90}/D_{10}$ less than 3.

57. The dispersion of non-milled barium titanate-based particles according to claim 49 wherein said dispersed coated non-milled particles have a particle size distribution decile ratio of $D_{90}/D_{10}$ less than 2.5.

58. The dispersion of non-milled barium titanate-based particles according to claim 49 wherein at least 90 percent of said coated non-milled particles have a particle size less than 0.8 micrometer when said particles are dispersed by high shear mixing.

59. The dispersion of non-milled barium titanate-based particles according to claim 49 wherein at least 90 percent of said coated non-milled particles have a particle size less than 0.7 micrometer when said particles are dispersed by high shear mixing.

60. The dispersion of non-milled barium titanate-based particles according to claim 49 wherein at least 90 percent of said coated non-milled particles have a particle size less than 0.6 micrometer when said particles are dispersed by high shear mixing.

61. The dispersion of non-milled barium titanate-based particles according to claim 49 wherein at least 90 percent of said coated non-milled particles have a particle size less than 0.5 micrometer when said particles are dispersed by high shear mixing.

62. The dispersion of non-milled barium titanate-based particles according to claim 49 wherein at least 90 percent of said coated non-milled particles have a particle size less than 0.4 micrometer when said particles are dispersed by high shear mixing.

63. The dispersion of non-milled barium titanate-based particles according to claim 49 wherein at least 90 percent of said coated non-milled particles have a particle size less than 0.3 micrometer when said particles are dispersed by high shear mixing.

64. The dispersion of non-milled barium titanate-based particles according to claim 49 wherein substantially all of said non-milled particles are equiaxed or spherical.

65. The dispersion of non-milled barium titanate-based particles according to claim 49 comprising at least 50 weight percent of said coated non-milled particles.

66. The dispersion according to claim 65 further comprising between 3 and 20 weight percent of a binder composition comprising a dissolved or suspended, film-forming, polymer.

67. A wet cake comprising the dispersion of coated non-milled barium titanate-based particles according to claim 49 including between 15 and 35 weight percent of an aqueous liquid.

68. The wet cake of claim 67 further comprising a moisture barrier that provides shelf life such that after 30 days said wet cake is dispersible by the admixture of a dispersing agent by high shear mixing into an aqueous dispersion of the coated non-milled particles, 90 percent of which have a particle size less than 1 micrometer.

69. The dispersion of claim 49, wherein the dispersion includes greater than 60 percent by weight of said dispersed coated particles.

70. The dispersion of claim 49, wherein the coating includes more than one chemically distinct layer, each layer comprising a metal oxide, metal hydrous oxide, metal hydroxide or organic acid salt of a metal other than barium or titanium.

71. The dispersion of claim 49, wherein the coating covers a major portion of the surface of said dispersed coated particles.

72. The dispersion of claim 49, wherein the dispersion includes greater than 40 percent by weight of said dispersed coated particles.

73. The dispersion of claim 49, wherein the dispersion includes greater than 60 percent by weight of said dispersed coated particles.

* * * * *